United States Patent [19]

Chamuel

[11] 4,231,260
[45] Nov. 4, 1980

[54] POSITION DETERMINING SYSTEM

[75] Inventor: Jacques R. Chamuel, Framingham, Mass.

[73] Assignee: The Charles Stark Draper Laboratory, Inc., Cambridge, Mass.

[21] Appl. No.: 957,462

[22] Filed: Nov. 3, 1978

[51] Int. Cl.$^3$ ............................................. G01N 29/00
[52] U.S. Cl. ........................................ 73/597; 367/125
[58] Field of Search ................ 73/597, 574, 578, 589;
324/207, 208, 11; 340/16 R; 367/7, 13, 87, 99, 118, 120, 123, 125

[56] References Cited

U.S. PATENT DOCUMENTS

| | | | |
|---|---|---|---|
| 3,121,955 | 2/1964 | King | 73/597 |
| 3,186,226 | 6/1965 | Milnes et al. | 73/579 |
| 4,035,762 | 7/1977 | Chamuel | 73/609 |
| 4,106,327 | 8/1978 | Adler et al. | 73/597 |
| 4,121,467 | 10/1978 | Gerhart | 73/597 |
| 4,144,574 | 3/1979 | Chamuel | 324/208 |

Primary Examiner—Stephen A. Kreitman
Attorney, Agent, or Firm—Robert F. O'Connell; Dike, Bronstein, Roberts, Cushman & Pfund

[57] ABSTRACT

A positioning determining system using a delay element and driver transducer for producing a traveling wave in the delay element, the presence of a traveling wave being detectable by a receiver transducer for determining the relative positions of the driver and receiving transducers. In accordance with the invention, a driver transducer, the delay element, and a second transducer form a self-excited feedback loop oscillator, the frequency of oscillation of which is determined by the spatial filtering provided by the second transducer so as to generate a traveling wave having a selected wavelength. The system includes automatic frequency selection to compensate for position sensing errors due to changes in the velocity of propagation of elastic waves arising because of temperature effects on the delay medium.

21 Claims, 8 Drawing Figures

POSITION DETERMINING SYSTEM

INTRODUCTION

This invention relates generally to position determining systems and, more particularly, to systems for making linear and angular position determinations, which systems provide for self-excited signal generation and automatic frequency selection to compensate for position sensing errors due to changes in the velocity of propagation of elastic waves arising because of temperature effects on the delay medium.

BACKGROUND OF THE INVENTION

An effective approach to linear and angular position determining systems has been shown in my previously issued U.S. Pat. No. 4,035,762, issued on July 12, 1977. Such patent describes various embodiments for measuring a position along a line, either straight or curved, or on a plane or other curvilinear surface, with a high degree of accuracy at a reasonable cost. The embodiments described therein generally require two relatively movable members. In a particular embodiment, for example, one member may comprise a driver transducer and a delay line, both fixedly positioned, and a second member may comprise a receiver transducer which is movable with respect to the fixed driver transducer and the delay line. The resolution of the displacement measurement depends upon the phase shift experienced by a continuous elastic wave traveling along the delay line element in a direction parallel to, or coincident with, the distance to be measured.

Various embodiments of the above concept are described in such issued patent. Further inventive position determining systems have also been described in my previously filed patent applications: Ser. No. 747,072, filed Dec. 2, 1976, now U.S. Pat. No. 4,121,155; Ser. No. 803,807, filed June 6, 1977, now U.S. Pat. No. 4,144,519; and Ser. No. 842,052, filed Oct. 14, 1977, now U.S. Design Patent D.252,775. All of said issued patent and patent applications are incorporated herein by reference.

Other position determining systems of various types have also been suggested in the past in addition to, and different from, those set forth in my above-referred to patents and patent applications. For example, previous systems have been described in U.S. Pat. No. 3,121,955, "Ultrasonic Distance Scaling Apparatus," issued to K. L. King on Feb. 25, 1961 and in the article "Precision Micropositioning Using Acoustic Surface Wave Variable Delay Lines," J. P. Baker et al., Review of Scientific Instruments, Vol. 45, No. 1, 1974.

In all of such systems a suitable signal generator for providing an excitation signal at a selected wavelength is utilized for supplying an electrical signal to a driver transducer which in turn produces the traveling elastic wave. Such signal generator is generally in the form of precision oscillator circuitry, the need for which represents additional costs and increased physical space requirements for the overall system. Moreover, temperature variations cause the velocity of propagation of the traveling wave to change in accordance therewith and a temperature compensation means, such as a phase-locked loop as described therein, is required to vary the frequency of the drive signal in order to compensate for such propagation velocity variations so as to maintain the same wavelength in the face of temperature variations. Although the use of the phase-locked loop approach permits compensation for all factors effecting the phase of the received signal, whether arising from temperature effects on the medium or from other sources, the need for such a phase-locked loop also represents an increase in the cost and spatial requirements of the overall position determining system.

It is desirable, therefore, in certain applications to eliminate the need for a separate external precision oscillator signal source and to provide for compensation of temperature variations, at least in the delay medium, in an effective manner which permits a simplification of the structure thereof as much as possible and a reduction in the overall cost while, at the same time, still providing high resolution position determination.

The generation of oscillating signals in delay media in general is, of course, known. For example, surface elastic wave oscillator devices for such purpose have been suggested in the past. Exemplary oscillators of such type have been described in "Surface-Acoustic-Wave Oscillators," J. Crabb et al., Electronics Letters, 17 May 1973, Vol. 9, No. 10, pp. 195–197; "Improvements to the SAW Oscillator," R. Bale et al., IGEE Cat. No. 74, CHO 896-ISU, pp. 272–275, 1974 Ultrasonics Symposium Proceedings. Further, an oscillator used in determining temperatures of a traveling strip of metal has been discussed in U.S. Pat. No. 3,186,226, "Apparatus for Determining the Temperature of Traveling Strip," issued on June 1, 1965, to J. S. Milner et al.

None of such devices, however, have been used in position determining systems nor has any technique for their use in such a context ever been previously suggested.

BRIEF SUMMARY OF THE INVENTION

The position determining system of this invention provides for the elimination of an external signal source and for the obtaining of compensation due to temperature variations in the delay medium. In accordance with a preferred embodiment thereof a transducer having a periodic configuration, e.g., a conductor fashioned in a periodic pattern, such as a periodic square wave pattern having a wavelength equal to the wavelength of the desired traveling wave signal, is fixedly mounted with reference to the delay line. A fixed driver transducer, such as a coil, is supplied from a high gain amplifier the input of which is connected to the periodic square wave pattern conductor. Noise output from the amplifier excites the driver transducer coil at a plurality of frequencies which in turn creates elastic wave components at such plurality of frequencies, which wave components travel along the delay line. The periodic wave conductor acts as a receiver transducer which responds primarily to the frequency component which has the same wavelength as the periodic pattern thereof. Accordingly, the square wave conducting means acts, in effect, as a filter for providing an input signal to the high gain amplifier at a particular selected frequency, which signal is in phase with the signal component at the output of the amplifier which has a wavelength corresponding to the selected wavelength dictated by the periodic pattern transducer. Such input signal is in turn amplified by the high gain amplifier to provide the excitation signal at such selected frequency for the driver transducer. The overall system thereby is self-excited when the gain of the amplifier is sufficiently large to overcome any signal losses in the delay line.

Since the frequency of the excitation signal is controlled by the average wavelength of the periodic pattern, if the periodic pattern tends to expand or contract due to temperature variations of the delay line medium, the frequency of oscillation tends to change in order to maintain a fixed relation between the phase angle of electrical signal and the phase angle of traveling wave signal so that such temperature variations are compensated for.

DESCRIPTION OF THE INVENTION

The invention can be described in various preferred embodiments in more detail with the help of the accompanying drawings wherein.

Figure 1:
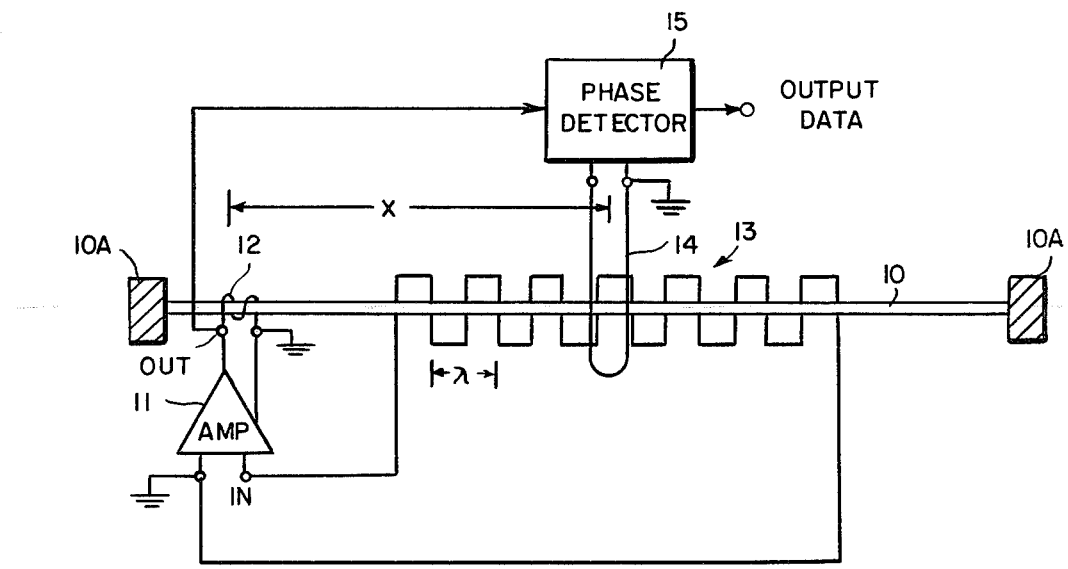
FIG. 1 shows one embodiment of the system of the invention using a periodic square-wave pattern transducer.

As can be seen in a preferred embodiment of the invention shown in FIG. 1, a magnetostrictive delay line 10, having signal damping elements 10A at either end thereof for preventing the reflection of signals therein (as discussed in my above referenced, previously issued patent), is mounted to provide a determination of a distance "X" along the direction of the delay line element. A high gain amplifier 11 supplies a noise output signal comprising a plurality of signal components at a plurality of different frequencies to a driver transducer 12, shown in the preferred embodiment as a coil coupled to magnetostrictive delay line 10 at a known location. Excitation of coil 12 produces a plurality of traveling elastic wave components of different frequencies which travel along delay line 10 in the direction "X."

The input to amplifier 11 is supplied from a conductive element 13 having a periodic square wave pattern which element is coupled to delay line 10 so as to detect the presence of such traveling wave components along the delay line element. The periodic pattern of conductive element 13 has a wavelength "λ" and the element is mounted in a fixed position relative to delay line 10. The elastic wave signal which travels along delay line 10 includes as one component thereof a traveling wave signal which has the frequency associated with the wavelength "λ." When the periodic detecting element 13 detects the presence of such traveling wave components such element in effect acts as a filter tuned to the frequency of that frequency component having the wavelength "λ." The signal which is so received by the periodic pattern element is supplied to the input of amplifier 11 in phase with the amplifier output signal component having the corresponding frequency so that, if the gain of the amplifier is sufficiently large to overcome any signal losses which may occur in the delay line, an oscillation will be set up at the frequency corresponding to the wavelength "λ." Because of the filtering action of the periodic element 13, the oscillation will occur only at such frequency and, therefore, an amplified wave having such frequency (which is tailored to the spacing of the periodic pattern) will travel along delay line element 10. The system shown in FIG. 1 effectively acts as a self-excited signal source and no external precision signal source at such frequency is required. A magnetic bias is required for the operation of the device as is also mentioned in my above-referenced patent and patent applications.

In order to measure the distance "X" from driver transducer 12, the system utilizes a receiver transducer 14 which, as exemplarily shown in FIG. 1, is in the form of a wire loop which moves relative to delay line 10 and, hence, relative to driver transducer 12 (as well as periodic detector element 13). Loop 14 acts in effect as a receiver, or pick-up, transducer and the distance "X" can be determined by measuring the phase difference between the phase angle of the oscillating signal at the driver transducer 12 and that of the traveling wave signal detected at receiver transducer 14. Such measurement can be made by suitable phase detector circuitry 15.

As discussed more fully in my above referenced U.S. patent, position measurements when using continuous wave signals of the type discussed above may require both a "coarse" and a "fine" measurement, the coarse measurement being determined by the number of integral cycles of the continuous wave signal between the driver transducer 12 and receiver transducer 14 so that a determination of the approximate distance therebetween to within one cycle (i.e., one wavelength) is determined. The phase difference as determined to within one such wavelength, thereupon provides a "fine" measurement of the overall distance between the driver and receiver transducer at a desired accuracy determined by the frequency of the continuous wave signal which is used. Since suitable exemplary techniques for providing such coarse and fine measurements are already described in my previous patent and patent applications, further details thereof need not be given here and, for simplicity, such coarse and fine measurements are represented as being made by the block labelled phase detector 15 in FIG. 1 and, in a comparable manner, in subsequent figures.

Figure 5:
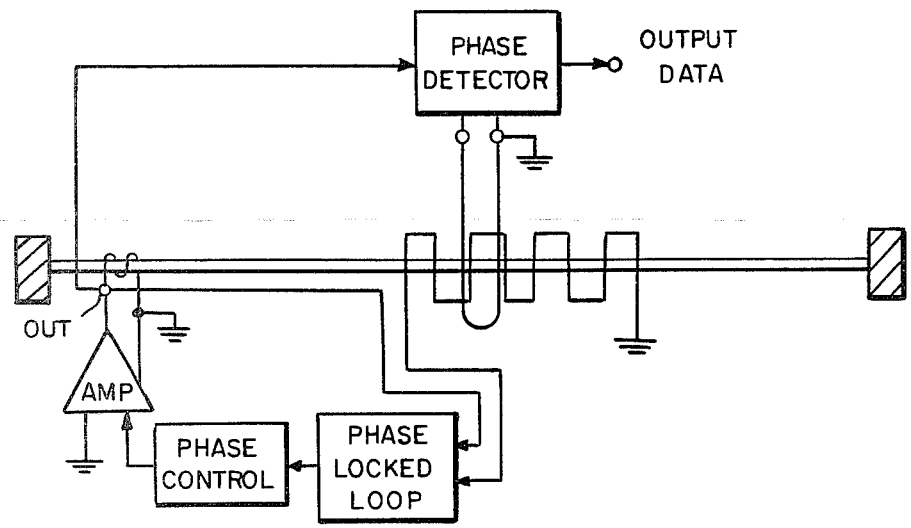
FIG. 5 shows an alternative embodiment of a portion the system of FIG. 1 using a phase-locked loop.

The input signal to amplifier 11 at the selected frequency can be arranged to be in phase with the output signal component having the corresponding frequency by suitably adjusting the spacing between the driver transducer 12 and the periodic element 13. Alternatively, suitable phase locked loop circuitry may be used to maintain such in-phase relationship, as shown in FIG. 5.

The precision external oscillator which is normally required for position determining measurements as described in my previous patent is thereby eliminated by the use of periodic wave pattern 13 which provides for the self-excited oscillator circuitry of FIG. 1 for producing a desired single frequency signal for the positioning determining operation.

A further advantage of the system shown in FIG. 1 lies in its ability automatically to compensate for temperature variations over a reasonable range which cause the velocity of propagation of the continuous traveling wave signal in the delay line to change in accordance with such temperature changes. As is described in my above referenced, previously issued patent, such temperature variations normally require additional means for compensating therefor, such as the phase-locked loop means described therein which compensates for velocity variations and, in effect, varies the frequency of the externally generated driver signal so as to maintain the same wave length of the signal traveling in the delay line. In the embodiment of FIG. 1 here, however, such frequency is automatically controlled by the average wavelength of the square wave pattern element 13. If the square wave conductor pattern expands or contracts uniformly because of temperature changes in the delay line medium, at least over a reasonable range of variations, the frequency of oscillation changes, accordingly, so as to maintain a fixed relation between the phase angle of the traveling wave signal and that of the electrical excitation signal. Changes in wavelength due to delay line temperature variations are thereby automatically compensated for and the need for a phase-locked loop for such purpose is eliminated. However, further receiver signal phase velocity variations also may arise for other reasons. In such cases it may be desirable to utilize a phase-locked loop system as discussed in my previously issued patent in the self-excited position sensing system of the invention to compensate therefor. Moreover, if the temperature of the delay line medium varies over a relatively wide range, the automatic operation discussed may not be adequate to provide such compensation (in some cases it may not be possible to keep the input and output of the amplifier in phase for oscillation purposes) and the use of a phase-locked loop may be necessary for such purpose.

The number of cycles of the periodic pattern of element 13 can be selected in accordance with the application in which the device is to be used. The larger the number of such cycles the sharper the filtering action of the periodic element. The filtering action can be improved also, if desired, by utilizing an external filter circuit, tuned to the desired frequency, between the periodic element 13 and the input to amplifier 11.

Figure 6:
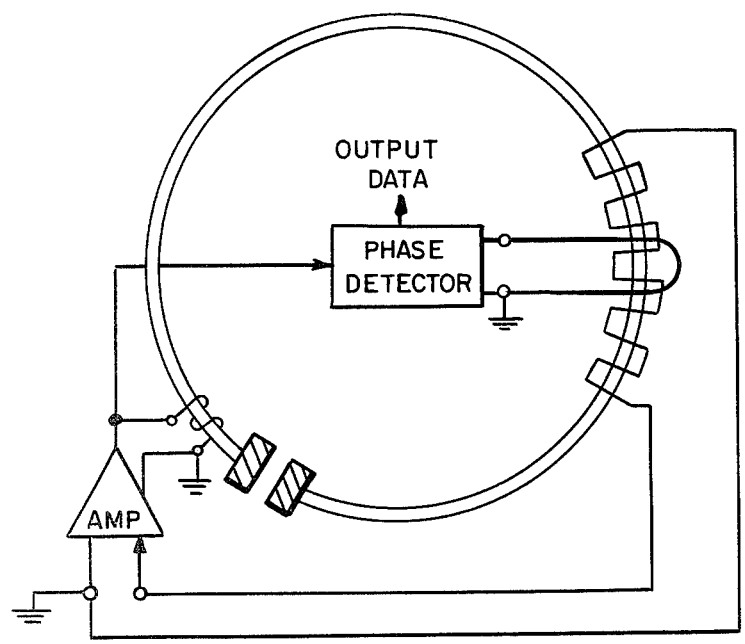
FIG. 6 shows an alternative embodiment of the system of FIG. 1 using a curvilinear delay line.

While the self-excited position determining system of the invention is discussed above with reference to the use thereof in the context of a linear delay line element for measuring distance along a linear direction, it is clear that the invention can be used for position determination in other contexts. Thus, the self-excited techniques disclosed herein can be used in the various linear, angular, and curvilinear measurement systems which are described in my above-referenced patent and patent applications an exemplary curvilinear system being depicted in FIG. 6.

While the use thereof in all such contexts would be clear to those in the art in accordance with the description of the invention herein it is helpful to describe here an exemplary use of the invention for position measurement with reference to a planar surface.

Figure 2:
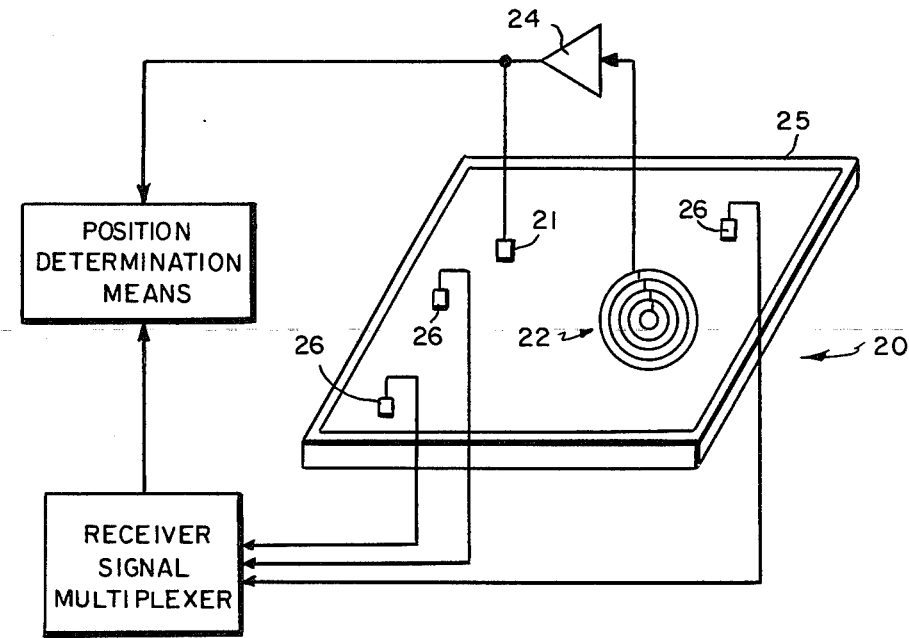
FIG. 2 shows an alternative embodiment of the invention for use in determining a position on the surface of a planar delay member.

The planar configuration of FIG. 2 shows a delay element in the form of a plate, or sheet, 20 of ferromagnetic material. A driver transducer 21 of the type as described with reference to FIGS. 16 and 16A of my previously issued U.S. Pat. No. 4,035,762 is positioned at a selected point, or region on the surface of plate 20. A transducer 22, comprising a plurality of series-connected, concentric coils 23 selectively spaced from each other, is positioned at a selected region of the surface remote from that of transducer 21 as shown. In the embodiment shown transducer 22 is connected to the input of an amplifier 24, the output of which is connected to transducer 21, although it is clear that the roles of transducers 21 and 22 may be reversed with reference to their connections to amplifier 24.

In this case, the transducer 22 acts in the same manner as the periodic element 13 of FIG. 1 so that an omnidirectional traveling acoustic wave signal having a wavelength (and, hence, a frequency) determined by the spacing of the elements of transducer 22 is generated at transducer 21.

The acoustic wave signals generated at transducer 21 are suitably damped by a damping material 25, such as damped rubber which is placed around the peripheral edges of plate 20 to prevent reflections of the acoustic wave at the discontinuities formed by such edges.

A plurality of receiver transducers 26 are positioned on the surface of plate 20, and, as described in my previously issued patent, the multiplexed outputs of such transducers and the input to transducer 21 are supplied to suitable computation means to calculate the selective position of the transducer 21 with respect to transducers 26.

Another application for the self-excited system described in FIG. 2 can be described with reference to FIG. 3. As seen therein, transducer 21 and periodic transducer 22 can be arranged to be fixedly positioned relative to each other, while being movable together relative to the surface of plate 20. If the properties of plate 20 are essentially homogeneous (i.e., the plate is isotropic so that such properties are the same in all directions), the velocity of propagation of an acoustic wave therein and, hence, the wavelength (and frequency) of such acoustic wave will be constant in all directions.

Accordingly, if a self-excited acoustic wave is generated by the operation of transducers 21 and 22 and amplifier 24, the frequency thereof can be suitably measured by a conventional frequency measuring device 28. The transducers 21 and 22 can be appropriately moved relative to the surface of plate 20, as shown exemplarily by the dashed-line configuration thereof, and the frequency of the self-excited acoustic signal determined in the new position. Since the acoustic wave travels in plate 20 along a first direction 29 and a second direction 30 in each instance, a variation in frequency will indicate a variation in the properties of plate 20 along each such direction, provided the magnetic bias is kept constant.

Since the transducers can be mounted so as to move relative to plate 20 the properties of plate 20 can be measured along as many different directions as desired. In this manner the isotropy of plate 20 can be determined using the techniques of the invention. Alternatively, either of the transducers 21 or 22 can be fixedly mounted generally at the center of plate 20, for example, and the other transducer mounted so as to be moved along a circular path about the fixedly mounted transducer. Changes in frequency of the received signal as the movable transducer moves along the circular path will provide an indication of the isotropy of plate 20.

Figure 4:
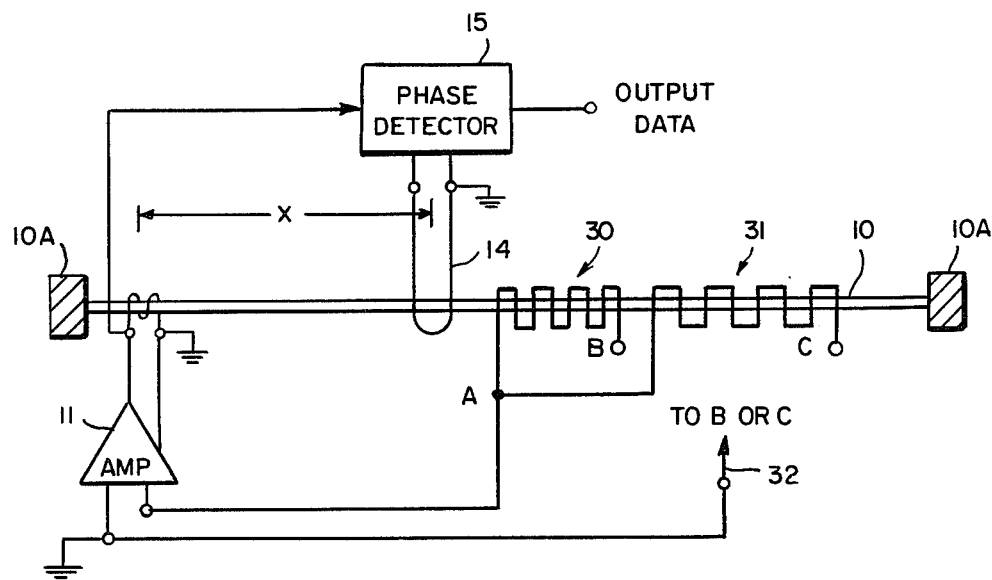
FIG. 4 shows an alternative embodiment of the system of FIG. 1.

The period of the periodic element of FIG. 1 can be selected to provide the resolution desired. The shorter the period (i.e., the higher the frequency) the better the resolution. As shown in FIG. 4, for example, a periodic element 30 is selected to have a period so as to provide for a signal having a wavelength, $\lambda$, while a periodic element 31, shown as having a longer period, can provide for a signal having a lower frequency and, hence, a longer wavelength, λ2. If the switch contact 32 is connected to point "B" a higher frequency traveling wave is produced, while if the switch contact is connected to point "C" a lower frequency traveling wave is produced.

Moreover, the use of two periodic elements, such as elements 30 and 31, for producing signals of two different frequencies can provide a technique for determining the coarse and fine distance measurements. The use of two different frequencies produces signals of two different wavelengths. A technique for providing coarse and fine measurements when provided with signals of two different wavelengths, is discussed in my previously filed application, Ser. No. 747,072, mentioned above, at FIG. 13 thereof. While in my previously described embodiment the signals of different wavelengths are produced simultaneously, in the embodiment of FIG. 4 herein such signals can be produced alternatively by the alternative use of elements 30 and 31 via appropriate switching techniques as shown. The multiplexed determinations of coarse and fine distance measurements can then be made in accordance with the techniques shown in my previously filed application.

Figure 3:
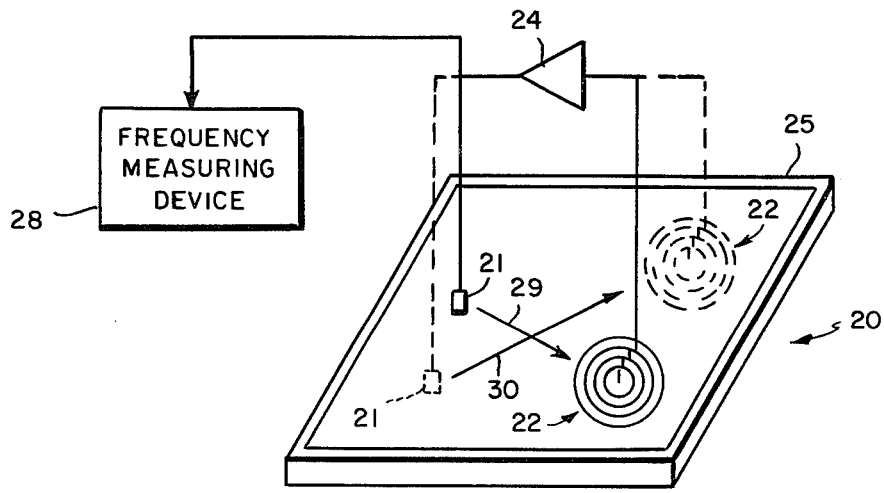
FIG. 3 shows an alternative embodiment of the system of FIG. 2 for determining the isotropy of a planar member.
Figure 7:
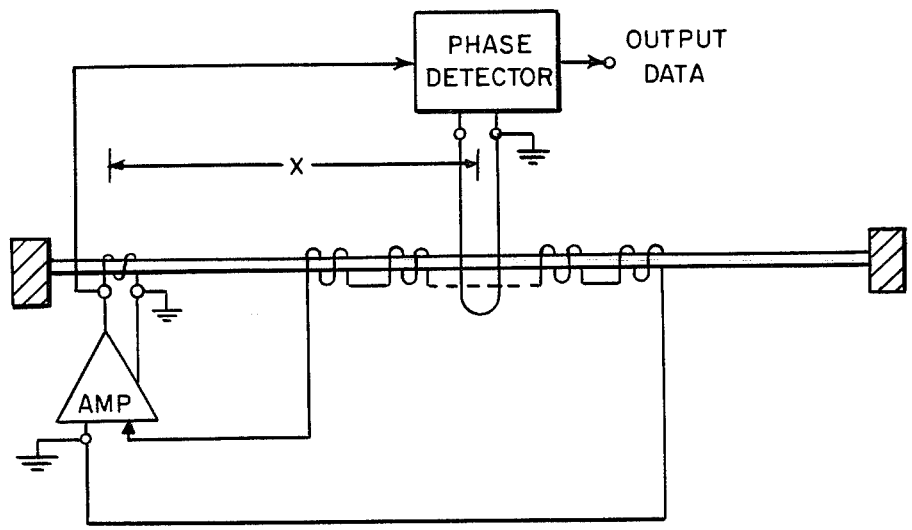
FIG. 7 shows an alternative embodiment of a portion of the system of FIG. 1 using a plurality of separate coils.

While the transducer 13 of FIG. 1 and transducers 30 and 31 of FIG. 4 are shown as square wave periodic patterns, any periodic array of elements of the type shown in FIG. 3 of my previously issued U.S. Pat. No. 4,035,762 can be used in the embodiments of the invention disclosed herein. For example, a plurality of separate, series-connected coils can be periodically spaced along the delay line, the spacing thereby determining the period thereof and, hence, the frequency of the self-excited signal which is so generated as shown in the exemplary embodiment of FIG. 7.

Figure 8:
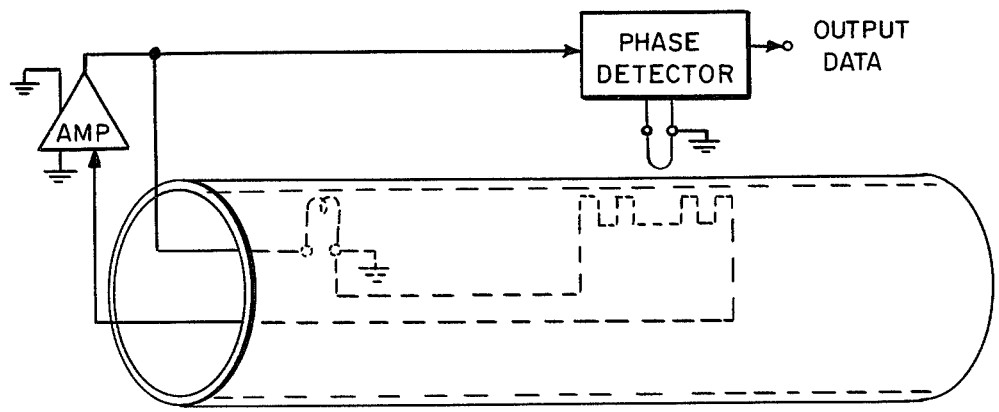
FIG. 8 shows an alternative embodiment of the invention as used with a hollow delay line element.

As a further alternative embodiment to those described above wherein the driver transducer and periodic transducer element, for example, are positioned adjacent a magnetostrictive delay line element, it is possible to utilize such elements within a hollow delay line element. Thus, the driver transducer and periodic transducer element may be mounted within the interior of a hollow cylinder, e.g. a pipe, made of suitable material for supporting a traveling wave. Such elements are adjacent the interior wall of the delay line element while the movable receiver transducer is mounted adjacent the exterior wall thereof, as shown in an exemplary embodiment of FIG. 8. In some applications such a configuration may be necessary or desirable and, moreover, assures that the receiver transducer is effectively shielded from the driver transducer elements if such shielding becomes helpful for best operation of the device.

While the embodiment of FIG. 1, for example, utilizes a fixed transducer 13 and a movable receiver transducer 14, it is possible to determine the distance "X" at least in a relatively coarse sense without the need for transducer 14. Thus, if periodic transducer 13 is made movable relative to transducer 12 (or vice-versa) so as to act itself as a receiver transducer, the amplitude characteristics of the self-excited signal which is so generated will vary periodically at a period corresponding to that of the transducer, the changing characteristic effectively depending on the sharpness of the filtering action of transducer 13. An oscillating signal at a frequency within the band of the filter will be produced by the loop so long as an input signal to the amplifier within the band is in phase with an output signal component of the amplifier.

For a relatively broad band filtering action by transducer 13, an oscillating signal will generally be produced as transducer 13 moves, until the transducer moves to an effective null position where no in-phase input signal and, hence, no traveling wave signal will be present. The detection of such null positions (i.e., the absence of a traveling wave signal) by transducer 13 will provide an indication of the changes in position of transducer 13 in a relatively coarse sense to within one wavelength equivalent to the transducer period.

For a relatively narrow band filtering action by transducer 13, a relatively sharp oscillating signal and, hence, traveling wave signal will be produced as the transducer moves through a distance equal to one wavelength (during the major portion of the motion through each such distance a null will occur). The detection of the presence of such traveling signal by transducer 13 will provide an indication of the changes in position of transducer 13, again in a relatively coarse sense, to within one wavelength.

Further, in such case if the damping elements 10A are eliminated so that reflections occur at the ends of delay element 10, a standing wave having the same frequency and amplitude variation will be produced in the delay element. The presence of the standing wave will enhance the ability to detect the null points or the oscillating points as transducer 13 moves along the delay element and, hence, the relative positions of the transducers 12 and 13 can also be determined to within one wavelength of the oscillating signal.

The standing wave technique can also be used to determine position more accurately, or used to provide a resolver operation as discussed with reference to FIGS. 25 and 26 of my previous application, Ser. No. 803,807. If in FIG. 1 herein the damping elements 10A are not used and the relative positions of transducers 12 and 13 are fixed, a standing wave will be produced at the frequency determined by the periodic transducer. In such case the use of movable transducer 14 will permit a more exact monitoring of the amplitude of the standing wave, such amplitude representing the exact position along the standing wave. In order to produce a resolver type operation wherein the sine or cosine of the phase angle of the standing wave can be determined a pair of appropriately spaced transducers can be used as the movable receiver transducer. The spacing and operation thereof is discussed more fully, for example, with respect to FIG. 25 of my above-referenced application.

Further variations in the above embodiments will occur to those in the art. Thus, as mentioned in my above-identified previous applications, the transducers may be formed in many configurations, particularly such as those shown in FIG. 3 of my issued U.S. Pat. No. 4,035,762. For example, the driver transducer 12 may be in the form of a periodic pattern rather than the coil shown in FIG. 1. If both transducers 12 and 13 have periodic configurations, the wavelengths thereof are the same. Moreover, the roles of the driver and receiver transducer elements may be reversed. Further, while the delay line material is discussed in a preferred embodiment as a magnetostrictive material using electromagnetic coupling, the invention is not limited either to such material or to such coupling technique. For example, conductive materials, wherein the transduction mechanism is based on Lorentz forces, can be used. Furthermore, electrostatic transduction can be used to generate electrostatic waves in piezoelectric materials or magnetostatic waves in magnetic materials, as would be known to the art. Moreover, mechanical coupling can also be utilized to generate traveling waves in a suitable medium. Further, the position determination can be used to determine the rate of change of such positions, i.e., for velocity measurements, as also discussed in my previously filed application, Ser. No. 747,072.

Moreover, with reference to measurements made on a planar surface, as discussed in connection with FIGS. 3 and 4, rather than using driver transducers in the form of coils for producing omnidirectional traveling waves, the driver transducers may be in the form of distributive transducers for producing plane wave signals, as discussed in my copending and concurrently filed application entitled "Two Coordinate Position Sensing Systems," incorporated by reference herein.

Other modifications within the spirit and scope of the invention may occur to those in the art and the invention is not to be construed as limited to the particular embodiments shown and described above, except as defined by the appended claims.

What is claimed is:

1. A position determining system comprising
at least one delay means capable of supporting a signal which travels along said delay means;
first transducer means coupled to said delay means and capable, when activated, of producing a traveling signal having at least one selected frequency, which signal travels along said delay means;
at least one second transducer means coupled to said delay means and responsive to said traveling signal to produce at least one electrical signal having said at least one selected frequency;
amplifier means responsive to said at least one electrical signal and capable of producing an output signal comprising a plurality of signal components of different frequencies, at least one of said signal components having said at least one selected frequency, said at least one electrical signal being arranged to be in phase with the at least one signal component having said at least one selected frequency;
means for supplying said output signal to said first transducer means to activate said first transducer means;
receiver transducer means relatively movable with respect to said delay means and coupled thereto for detecting said traveling signal as it travels past said receiver transducer means;
means for determining the delay of said detected signal as it travels from said first transducer means to said receiver transducer means whereby the position of said receiver transducer means relative to said first transducer means is determined; and
means for substantially reducing reflections of said traveling signal in said delay means.

2. A position determining system in accordance with claim 1 wherein said delay means is a curvilinear delay line and supports a traveling wave which travels along a specified direction.

3. A position determining system in accordance with claim 2 wherein said delay line is substantially linear and said traveling wave travels substantially along a straight line.

4. A position determining system in accordance with claim 1 wherein said first and second transducer means are fixedly positioned relative to said delay means.

5. A position determining system in accordance with claim 4 wherein the spacing between said first and second transducer means is selected so that said electrical signal and said one signal component are in phase.

6. A position determining system in accordance with claim 4 and further including means for controlling the phase of said electrical signal so that said electrical signal and said one signal component are in phase.

7. A position determining system in accordance with claim 6 wherein said controlling means is a phase-locked loop circuit.

8. A position determining system in accordance with claim 1 wherein said second transducer means has a periodic configuration, the period of which corresponds to the period of said at least one selected frequency, said periodic configuration thereby providing an effective filter operation with respect to said electrical signal.

9. A position determining system in accordance with claim 8 wherein the number of periods in the periodic configuration of said second transducer means is selected to control the filter operation of said second transducer means.

10. A position determining system in accordance with claims 8 or 9 and further including filter circuit means connected to said second transducer means and responsive to said electrical signal for further controlling the filter operation of said second transducer means.

11. A position determining system in accordance with claim 1 wherein said second transducer comprises a continuous conductive element forming a plurality of interconnected square wave patterns, the period of each of said square wave patterns being selected in accordance with said at least one selected frequency.

12. A position determining system in accordance with claim 1 wherein said second transducer means comprises a plurality of separate coils connected in series, the spacing between said coils being selected in accordance with said at least one selected frequency.

13. A position determining system in accordance with claim 1 wherein
said delay means is formed as a hollow cylinder;
said first and second transducer means are mounted within the interior of said cylinder and are coupled to the interior wall thereof; and
said receiver transducer means is mounted externally to said cylinder and is coupled to the exterior wall thereof.

14. A position determining system in accordance with claim 1 wherein said delay has a planar surface and is capable of supporting traveling signals which travel omnidirectionally in said delay means.

15. A position determining system in accordance with claim 1 wherein said at least one second transducer means comprises a plurality of selectable transducers each coupled to said delay means and capable of producing a plurality of electrical signals having a plurality of selected frequencies, the selection of one of said plurality of transducers providing a traveling signal at the selected frequency associated therewith.

16. A position determining system in accordance with claim 1 wherein said at least one second transducer means comprises a pair of transducers each coupled to said delay means and capable of producing a pair of electrical systems having two different frequencies to provide separate traveling signals at each of said two frequencies;

said receiver transducer means detecting separately said traveling signals as they travel past said receiver transducer means; and means responsive to said detected traveling signals for determining the position of said receiver transducer means relative to said first transducer means.

17. A system for determining the isotropy of a planar member capable of supporting traveling signals therein, said system comprising first transducer means coupled to said planar member and capable, when activated, of producing an omnidirectional traveling signal having at least one selected frequency which traveling signal travels omnidirectionally in said planar member;

second transducer means having a periodic configuration coupled to said planar member and responsive to the detection of said omnidirectional traveling signal so as to produce an electrical signal having said at least one selected frequency;

amplifier means responsive to the said electrical signal and capable of producing an output signal comprising a plurality of signal components at different frequencies, one of said signal components having said at least one selected frequency, said electrical signal being arranged to be in phase with the one signal component having said at least one selected frequency;

means for supplying said output signal to said first transducer means to activate said first transducer means;

means responsive to said output signal for measuring the frequency thereof;

means for moving at least one of said first and second transducer means relative to the planar surface of said planar member so that said traveling signal traveling between said first and second transducer means travels along a plurality of different paths in said planar member, the frequency of said output signs produced thereby depending on the characteristics of said planar member in the directions of said plurality of different paths, whereby changes in the frequency of said output signals indicate the isotropy of said planar member.

18. A system in accordance with claim 15 wherein one of said first and second transducer means is fixedly positioned with respect to said planar surface and the other of said first and second transducer means is arranged for movement about said fixed position along a selected path.

19. A system in accordance with claim 16 wherein said selected path is generally circular.

20. A position determining system comprising at least one delay means capable of supporting a signal which travels along said delay means;

first transducer means coupled to said delay means and capable, when activated, of producing a traveling signal having at least one selected frequency, which signal travels along said delay means;

at least one second transducer means coupled to said delay means and responsive to said traveling signal to produce at least one electrical signal having said at least one selected frequency;

amplifier means responsive to said at least one electrical signal and capable of producing an output signal comprising a plurality of signal components of different frequencies, at least one of said signal components having said at least one selected frequency, said at least one electrical signal being arranged to be in phase with the at least one signal component having said at least one selected frequency;

means for supplying said output signal to said first transducer means to activate said first transducer means;

said second transducer means being relatively movable with respect to said first transducer means and to said delay means and being capable of detecting the presence or absence of said traveling signal in said delay means as said second transducer moves relative thereto whereby the position of said second transducer means relative to said first transducer means is determined.

21. A position determining system in accordance with claim 20 and further including means for substantially reducing reflections of said traveling signal in said delay means.

* * * * *